(12) United States Patent
Chih (10) Patent No.: US 9,151,344 B2
(45) Date of Patent: Oct. 6, 2015

(54) RATCHET PULLEY

(71) Applicant: Gordon Chih, Changhua Hsien (TW)

(72) Inventor: Gordon Chih, Changhua Hsien (TW)

(*) Notice: Subject to any disclaimer, the term of this patent is extended or adjusted under 35 U.S.C. 154(b) by 148 days.

(21) Appl. No.: 14/075,751

(22) Filed: Nov. 8, 2013

(65) Prior Publication Data

US 2014/0131157 A1    May 15, 2014

(30) Foreign Application Priority Data

Nov. 12, 2012  (TW) .............................. 101221841 U (51) Int. Cl.
*F16D 41/12*    (2006.01)
*F16D 41/02*    (2006.01)
*F16D 41/16*    (2006.01)
*B66D 3/10*     (2006.01)

(52) U.S. Cl.
CPC ....... *F16D 41/12* (2013.01); *B66D 3/10* (2013.01); *F16D 41/02* (2013.01); *F16D 41/16* (2013.01)

(58) Field of Classification Search
CPC ......... F16D 41/04; F16D 41/12; F16D 41/16; B66D 3/04; B66D 3/10

USPC ......................................................... 192/43.1
See application file for complete search history.

(56) References Cited

U.S. PATENT DOCUMENTS 7,628,384 B2 *  12/2009  Smith .......................... 254/413

* cited by examiner

*Primary Examiner* — Robert Hodge
*Assistant Examiner* — Tinh Dang
(74) *Attorney, Agent, or Firm* — Guice Patents PLLC (57) ABSTRACT

A ratchet pulley includes a housing, a hub, an annular pulley and a selection device. The housing has two openings for a rope to go into and go out of the housing. The hub is received in the housing and reciprocally movable between an upper position and a lower position. The annular pulley is received in the housing and rotatable on the circumference of the hub. The rope is wound over the annular pulley. The selection device is disposed in the internal space of the hub and has a rotatable rod exposed to outer side for selecting whether the rotational direction of the annular pulley is limited or not limited or is limited when the rope is pulled and the annular pulley is loaded.

16 Claims, 7 Drawing Sheets

RATCHET PULLEY

BACKGROUND OF THE INVENTION

1. Field of the Invention

The present invention relates generally to a bearing pulley structure, and more particularly to a ratchet pulley.

2. Description of the Related Art

The conventional bearing pulley used on a sailboat includes a pulley and a connection section such as a shackle. A rope is wound over the pulley. The connection section is used to support the mast, yard or deck of the sailboat. On the demand of sailing control, the bearing pulleys respectively installed in different positions are required to have work-saving devices with ratchet function.

A common bearing pulley can be rotated left and right (counterclockwise and clockwise). An improved bearing pulley has been developed, which has a selection switch for switching the bearing pulley between two modes. One of the modes is to left and right rotate the bearing pulley, while the other of the modes is to one-way rotate the bearing pulley.

There is another type of bearing pulley in which when the rope is pulled and the pulley is loaded, the rotational direction of the pulley is limited.

Accordingly, there are two kinds of bearing pulleys arranged in different positions in accordance with different requirements.

Furthermore, there is a three-in-one bearing pulley with the above three functions. Such bearing pulley has two selection switches. One of the switches is used to select whether the bearing pulley is left and right rotatable or one-way rotatable. The other of the switches is used to select that the rotational direction of the pulley is limited when the rope is pulled and the pulley is loaded. Such bearing pulley is advantageous in that it can be freely installed in any desired position. However, such bearing pulley has a larger size. In other words, it is impossible for a small-size bearing pulley to have two switches. Moreover, it is still inconvenient to use the bearing pulley with two selection switches.

SUMMARY OF THE INVENTION

It is therefore a primary object of the present invention to provide a ratchet pulley, which can be switched between different positions to provide different functions only by means of one selection switch.

It is a further object of the present invention to provide the above ratchet pulley, which can be readily and conveniently used and is work-saving and easy to control.

To achieve the above and other objects, the ratchet pulley of the present invention includes a housing, a hub, an annular pulley and a selection device. The housing has two openings for a rope to go into and go out of the housing. The hub is received in the housing and reciprocally movable between an upper position and a lower position. The annular pulley is received in the housing and rotatable on the circumference of the hub. The rope is wound over the annular pulley. The selection device is disposed in the internal space of the hub and has a rotatable rod exposed to outer side for selecting whether the rotational direction of the annular pulley is limited or not limited or is limited when the rope is pulled.

The present invention can be best understood through the following description and accompanying drawings, wherein:

DETAILED DESCRIPTION OF THE PREFERRED EMBODIMENTS

Please refer to FIGS. 1 to 6. The ratchet pulley of the present invention includes a housing 12, a hub 14, an annular pulley 16 and a selection device 18.

Figure 1:
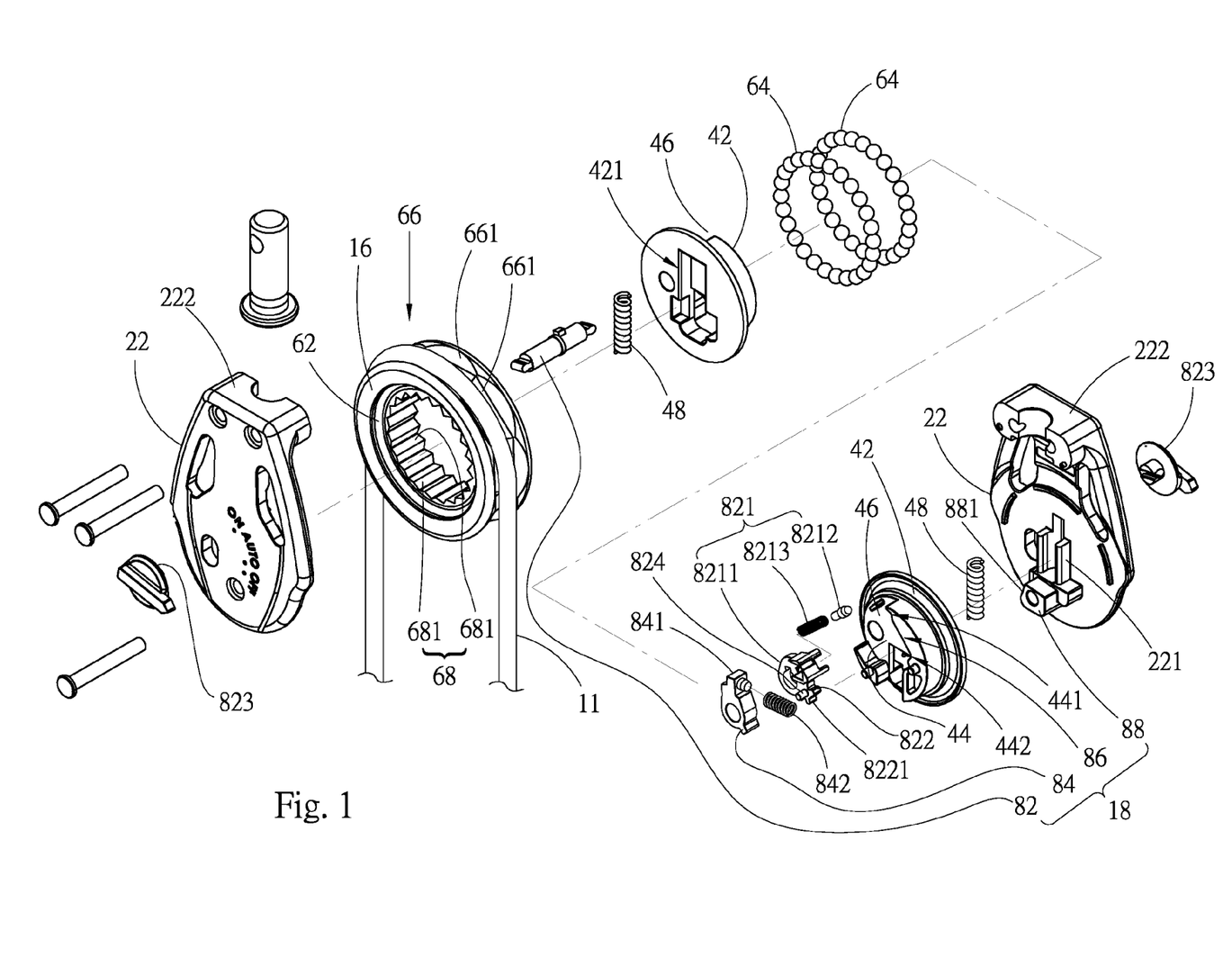
FIG. 1 is a perspective exploded view of a preferred embodiment of the present invention.
Figure 2:
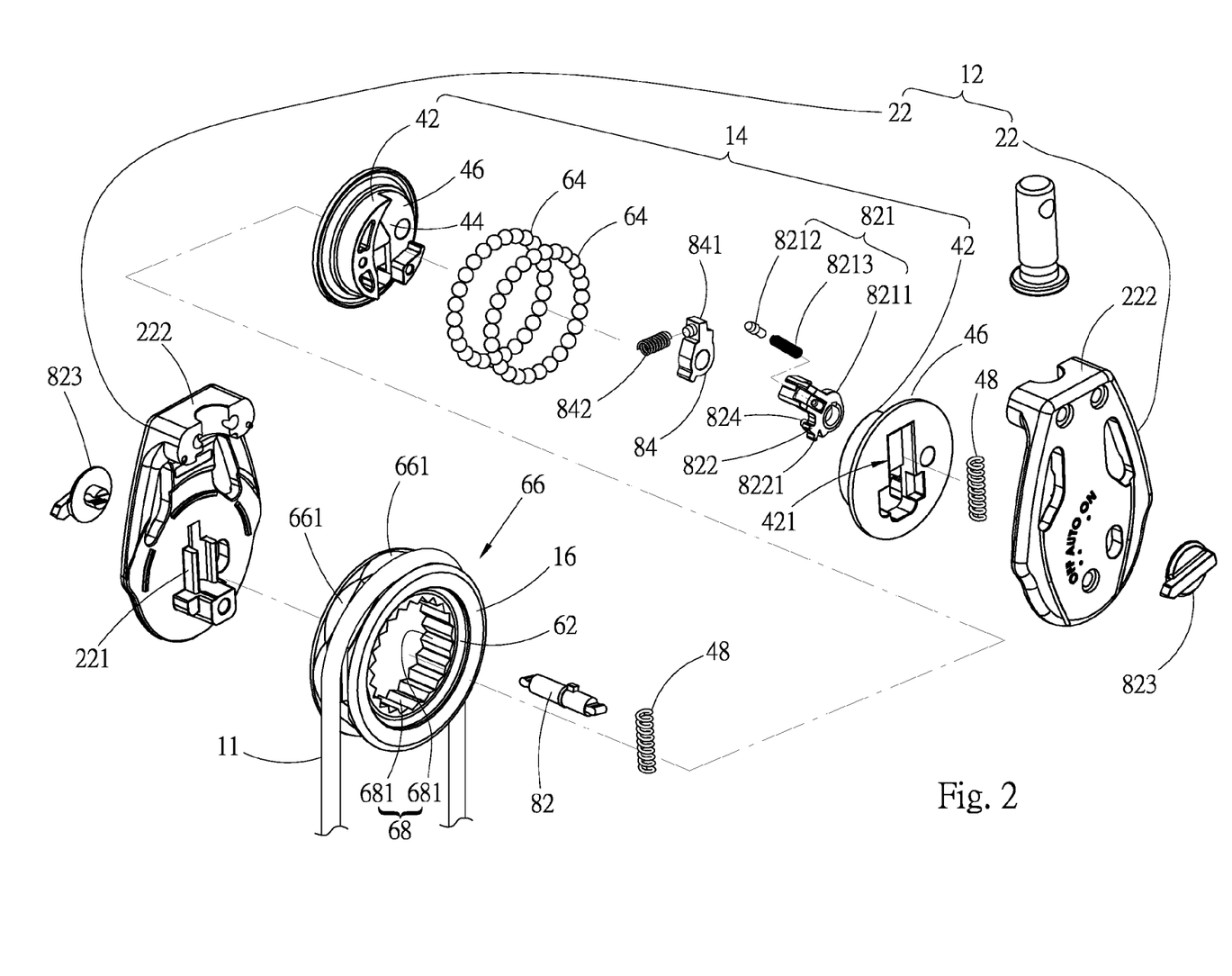
FIG. 2 is a perspective exploded view of the preferred embodiment of the present invention according to FIG. 1, seen from another angle.

The housing 12 is composed of a pair of side plates 22, which are spaced from each other and in parallel to each other. The two side plates 22 are fixedly connected with each other by means of screws or rivets. The housing 12 has two openings for a rope 11 to go into and go out of the housing 12. A first slide section 221 is disposed on inner face of at least one of the side plates 22. The two side plates 22 partially upward extend to form a connection section 222 for connecting with other devices or apparatuses. However, the connection section 222 is omissible. Because some pulley can uses a rope going into and going out of the pulley to achieve a fastening function.

Two half hubs 42 are correspondingly connected with each other to form the hub 14. The hub 14 is received in the housing 12 with two end faces respectively facing the inner faces of the side plates 22. The hub 14 has an internal space 44. A lateral opening 46 is formed on a circumference of the hub 14. Three recesses are sequentially arranged on inner wall of the hub 14 to form a first position 441, a second position 442 and a third position 443 respectively. A second slide section 421 is disposed on at least one of the half hubs 42 corresponding to the first slide section 221.

The second slide section 421 is slidably disposed on the first slide section 221, whereby the hub 14 is reciprocally movable between an upper position and a lower position. An elastic body 48 such as a coiled spring is disposed between the first and second slide sections 221, 421.

When no pull force is applied to the rope 11, that is, when the hub 14 is free from any load, the elastic body 48 makes the hub 14 move to the upper position.

The annular pulley 16 is received in the housing 12. Each of two end faces of the annular pulley 16 has an annular bearing rotational face 62 rotatable on the circumference of the hub 14. A bearing 64 such as a ball bearing is disposed between the bearing rotational face 62 and the hub 14 to reduce friction. The annular pulley 16 has an outer circumference 66 with a groove for receiving the rope 11. A first engagement section 68 is disposed on an inner circumference of the annular pulley 16. The outer circumference 66 of the annular pulley 16 is formed with multiple continuously bent plane faces 661 for avoiding slippage of the rope 11. The first engagement section 68 is composed of multiple teeth 681 annularly arranged on the inner circumference of the annular pulley 16.

The selection device 18 is disposed in the internal space 44 of the hub 14. The selection device 18 includes a rotatable rod 82, a rock block 84, a guide slope 86 and an activation section 88.

At least one end of the rotatable rod 82 passes through an end face of the hub 14 and the side plate 22 corresponding to the end face. The rotatable rod 82 includes a locating section 821 and a protrusion section 822. The locating section 821 serves to at least locate the rotatable rod 82 in the first, second or third position 441, 442, 443.

The locating section 821 includes a block body 8211, a locating pin 8212 and an elastic body 8213. The block body 8211 is fixedly fitted on a middle section of the rotatable rod 82. The locating pin 8212 and the elastic body 8213 are received in the block body 8211. The elastic body 8213 such as a coiled spring is disposed between the block body 8211 and the locating pin 8212 for pushing the locating pin 8212 to provide a locating effect.

The protrusion section 822 outward extends from one side of the block body 8211.

Figure 3:
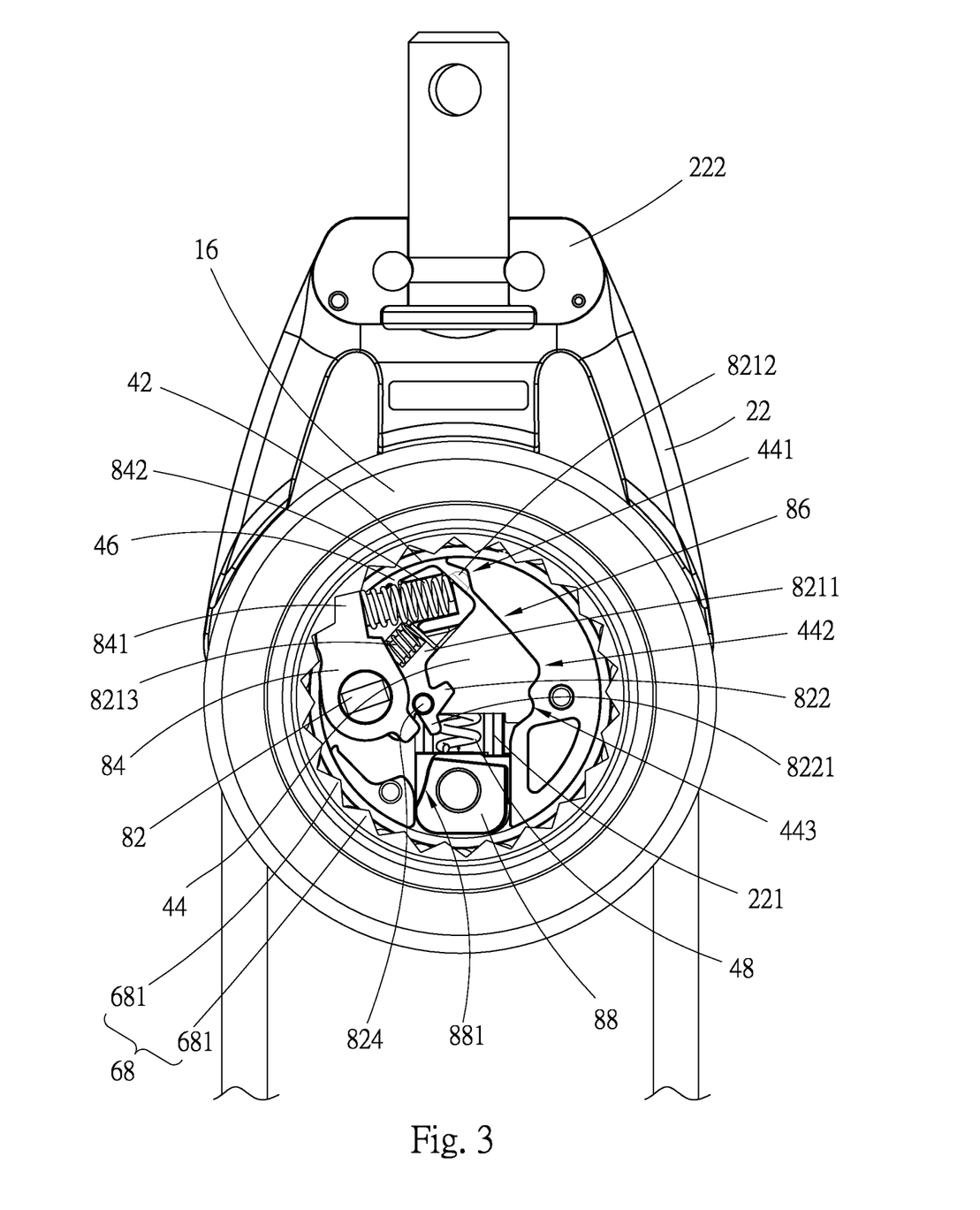
FIG. 3 is a front view of the present invention, in which one side plate is removed to show that the locating section is positioned in the first position.
Figure 4:
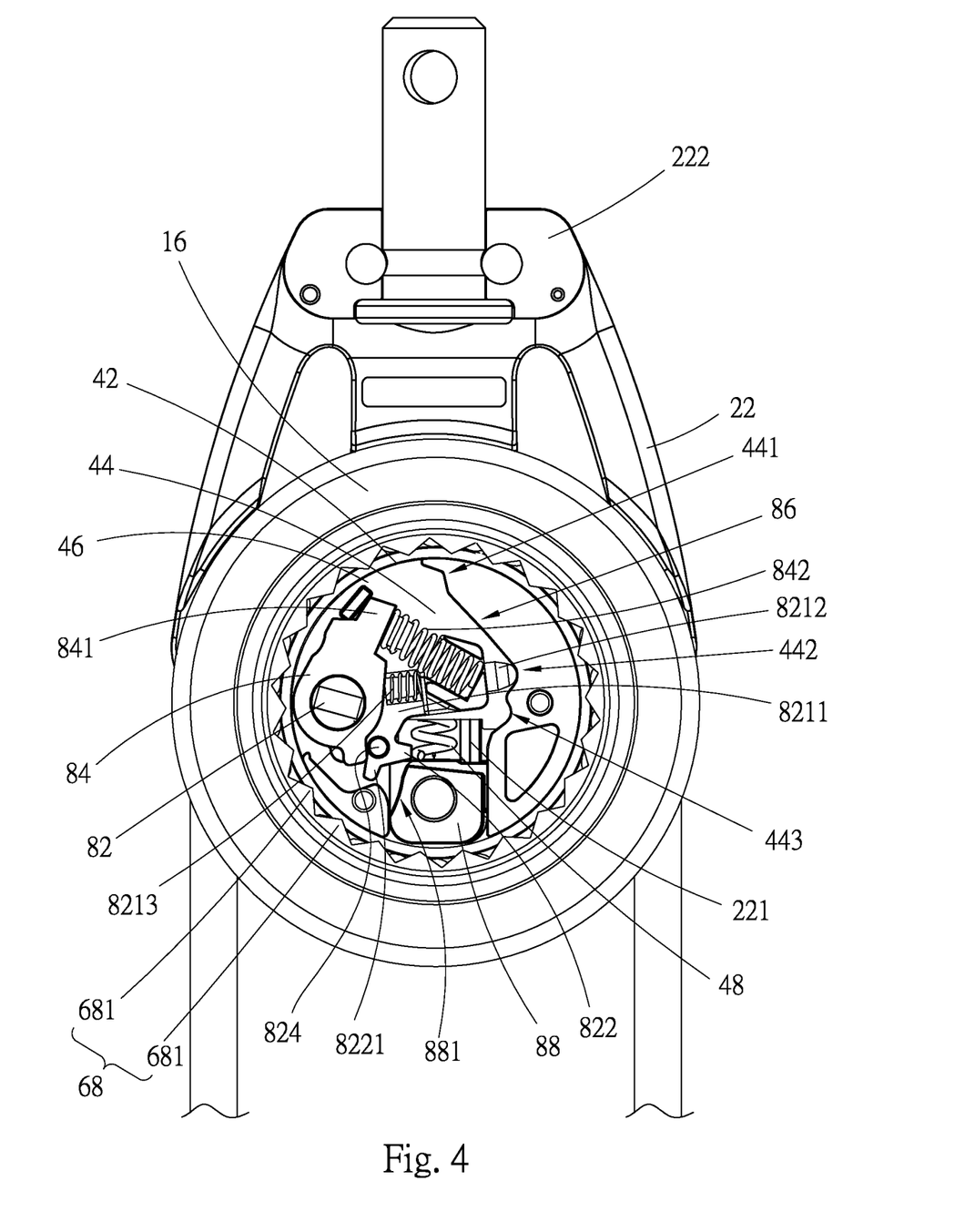
FIG. 4 is a front view of the present invention, in which one side plate is removed to show that the locating section is positioned in the second position.
Figure 5:
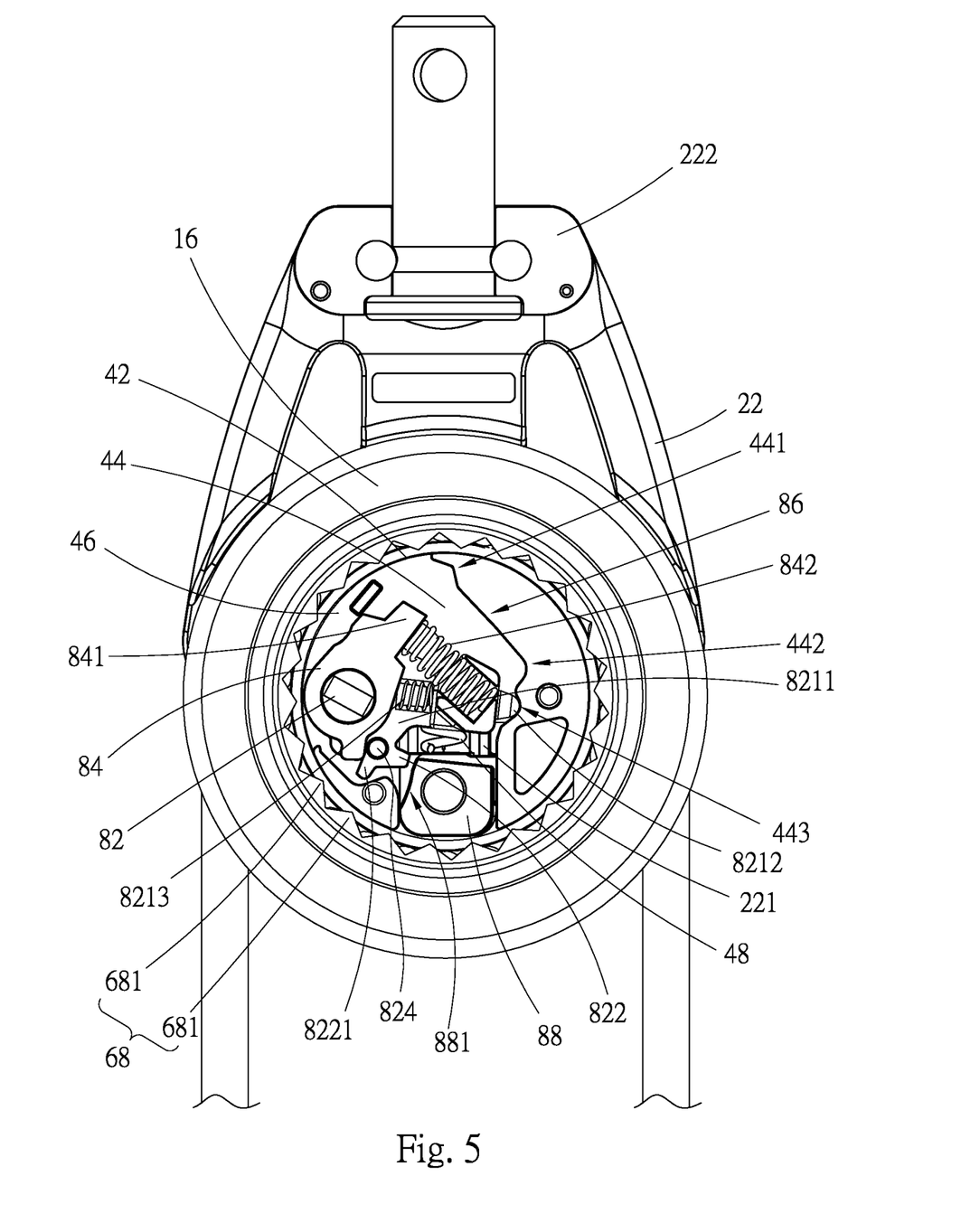
FIG. 5 is a front view of the present invention, in which one side plate is removed to show that the locating section is positioned in the third position.
Figure 6:
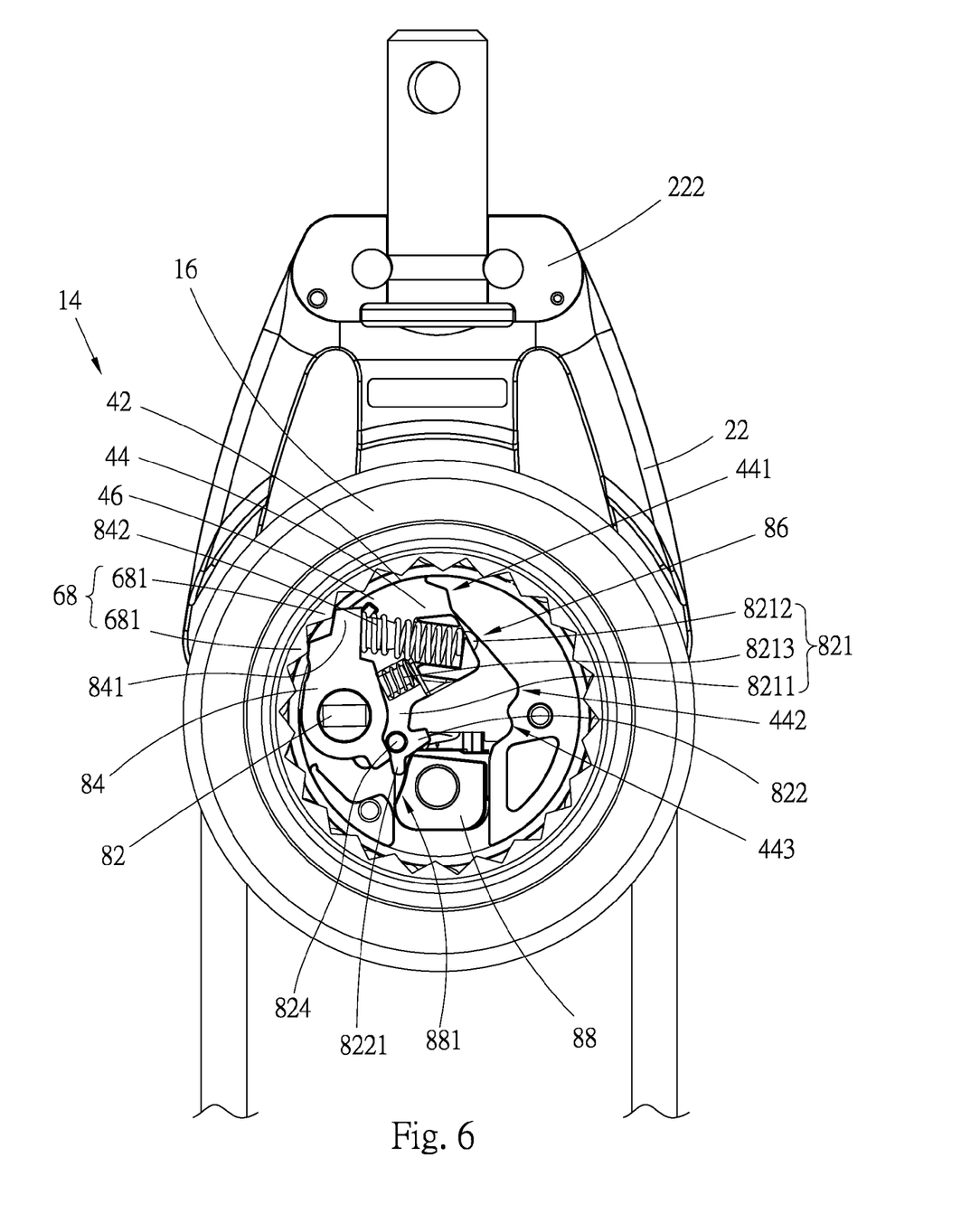
FIG. 6 is a front view of the present invention, in which one side plate is removed to show that the activation section abuts against and pushes the protrusion section to drive the locating section and make the locating section positioned between the first and second positions.

One end of the rock block 84 is pivotally fitted on the rotatable rod 82. The other end of the rock block 84 is formed with a second engagement section 841. The second engagement section 841 is a protrusion block with a configuration corresponding to the tooth space between two teeth 681. An elastic body 842 such as a coiled spring is disposed between the rock block 84 and the block body 8211 of the rotatable rod 82 for making the second engagement section 841 move toward the lateral opening 46 of the hub 14 and locating the second engagement section 841 as follows:

1. When the rotatable rod 82 is positioned in the first position 441, the second engagement section 841 is engaged with the first engagement section 68 to prevent the annular pulley 16 from counterclockwise rotating (as shown in FIG. 3).
2. When the rotatable rod 82 is positioned between the first and second positions 441, 442, the second engagement section 841 is engaged with the first engagement section 68 to prevent the annular pulley 16 from counterclockwise rotating (as shown in FIG. 6).
3. When the rotatable rod 82 is positioned in the second and third positions 442, 443, the second engagement section 841 is disengaged from the first engagement section 68, whereby the rotational direction of the annular pulley 16 is not limited (as shown in FIGS. 4 and 5).

The guide slope 86 is positioned between the first position 441 and the second position 442.

The activation section 88 is disposed at one end of the first slide section 221. When the rotatable rod 82 is positioned in the second position 442 and an external force is applied to the annular pulley 16 and the hub 14 to move the annular pulley 16 and the hub 14 to the lower position (as shown in FIG. 6), the activation section 88 abuts against and pushes the protrusion section 822 of the rotatable rod 82 to drive the block body 8211 of the locating section 821. Accordingly, the rotatable rod 82 is positioned between the first and second positions 441, 442. When the external force disappears, the protrusion section 822 of the rotatable rod 82 is released from the activation section 88 and the guide slope 86 guides the locating pin 8212 of the locating section 821 to move to the second position 442, whereby the rotatable rod 82 is restored to the second position 442. It should be noted that in the case that the external force is insufficient to move the annular pulley 16 and the hub 14 downward and thus cannot make the activation section 88 abut against and push the protrusion section 822 of the rotatable rod 82, then the rotational direction of the annular pulley 16 will not be limited.

Please now refer to FIGS. 1 and 2. One end of the rotatable rod 82 that is exposed to outer side of the side plate 22 is provided with a rotary button 823. The rotary button 823 has an indicator for pointing at the marks disposed on the outer face of the side plate 22 such as ON, AUTO and OFF, wherein:

1. When the indicator is pointed at ON, the rotatable rod 82 is positioned in the first position 441 and it is indicated that the annular pulley 16 can be only one-way rotated.
2. When the indicator is pointed at OFF, the rotatable rod 82 is positioned in the third position 443 and it is indicated that the rotational direction of the annular pulley 16 is not limited.
3. When the indicator is pointed at AUTO, the rotatable rod 82 is positioned in the second position 442 and it is indicated that when a force is applied to the rope 11 on the annular pulley 16, that is, when the annular pulley 16 is loaded, the annular pulley 16 can be only one-way rotated. On the other hand, in the case that the force applied to the rope 11 is too little to move the annular pulley 16 downward, the rotational direction of the annular pulley 16 will not be limited.

Please now refer to FIG. 6. When the AUTO function is selected, that is, when the rotatable rod 82 is positioned in the second position 442 and an external force is applied to the annular pulley 16 and the hub 14 to move the annular pulley 16 and the hub 14 toward the lower position, the rotatable rod 82 is activated to be positioned between the first and second positions 441, 442. In order to prevent the rotatable rod 82 from moving the first position 441, the activation section 88 is further provided with a security face 881. A security protrusion 8221 corresponding to the security face 881 is disposed on one side of the protrusion section 822 that faces the security face 881. The protrusion section 822 serves to abut against the security face 881 to prevent the rotatable rod 82 from moving to the first position 441.

Please further refer to FIG. 6. In the ratchet pulley of the present invention, a boss 824 outward extends from one end of the block body 8211 to abut against one end of the rock block 84, whereby when the elastic body 842 pushes the rock block 84, the rock block 84 can be more truly located.

Figure 7:
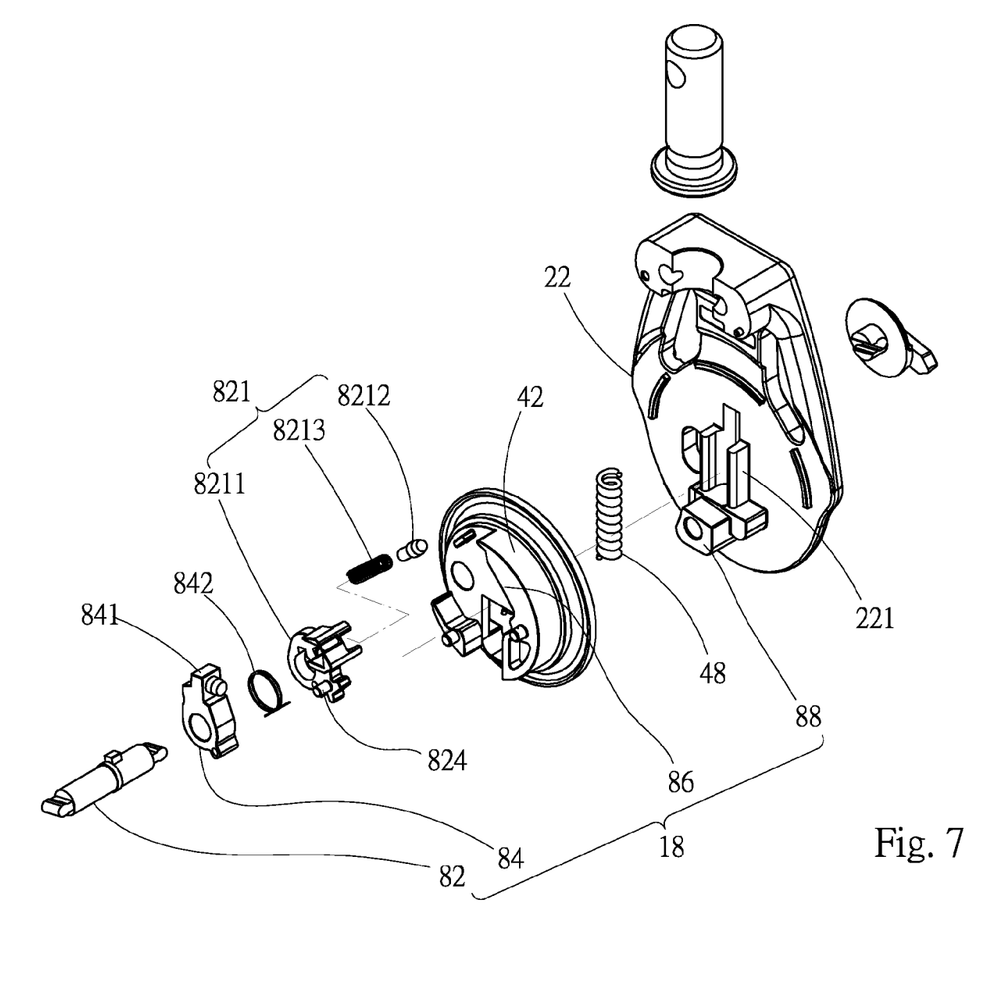
FIG. 7 is a perspective partially exploded view of another preferred embodiment of the present invention.

Please refer to FIG. 7. In another embodiment of the ratchet pulley of the present invention, the elastic body 842 disposed between the rock block 84 and the block body 8211 of the rotatable rod 82 is alternatively a torque spring. This embodiment can achieve the same effect as the first embodiment to the present invention.

The ratchet pulley of the present invention has the following advantages:

1. The boat pulley can be switched between different positions to provide different functions only by means of one selection switch. The ratchet pulley of the present invention can be readily and conveniently used.
2. The size of the present invention is smaller than that of the conventional boat pulley, which employs two selection switches.

What is claimed is:

1. A ratchet pulley comprising:
a housing composed of two side plates, the housing having two openings for a rope to go into and go out of the housing, a first slide section being disposed on inner face of at least one of the side plates;
a hub formed of two half hubs, the hub being received in the housing with two end faces respectively facing the inner faces of the side plates, the hub having an internal space, a lateral opening being formed on a circumference of the hub, a first position, a second position and a third position being disposed in the internal space, a second slide section being disposed on at least one of the half hubs corresponding to the first slide section, the second slide section being slidably disposed on the first slide section, whereby the hub is reciprocally movable between an upper position and a lower position, a first elastic body being disposed between the first and second slide sections, when no pull force is applied to the hub, the first elastic body making the hub move to the upper position;

an annular pulley received in the housing, each of two end faces of the annular pulley having an annular bearing rotational face rotatable on the circumference of the hub, the annular pulley having an outer circumference with a groove for receiving the rope, a first engagement section being disposed on an inner circumference of the annular pulley;

a selection device disposed in the internal space of the hub, the selection device including a rotatable rod, a rock block, a guide slope and an activation section, at least one end of the rotatable rod passing through an end face of the hub and the side plate corresponding to the end face, the rotatable rod including a locating section and a protrusion section, the locating section serving to at least locate the rotatable rod in a position selected from a group consisting of the first, second and third position, one end of the rock block being pivotally fitted on the rotatable rod, the other end of the rock block being formed with a second engagement section, a second elastic body being disposed between the rock block and the rotatable rod for making the second engagement section move toward the lateral opening of the hub and locating the second engagement section as follows:
  (1) when the rotatable rod is positioned in the first position, the second engagement section is engaged with the first engagement section to limit the rotational direction of the annular pulley;
  (2) when the rotatable rod is positioned between the first and second positions, the second engagement section is engaged with the first engagement section to limit the rotational direction of the annular pulley; and
  (3) when the rotatable rod is positioned in the second and third positions, the second engagement section is disengaged from the first engagement section, whereby the rotational direction of the annular pulley is not limited;

the guide slope being disposed between the first position and the second position; and the activation section being disposed at one end of the first slide section, when the rotatable rod is positioned in the second position and an external force is applied to the annular pulley and the hub to move the annular pulley and the hub to the lower position, the activation section abutting against and pushing the protrusion section of the rotatable rod to drive the locating section, whereby the rotatable rod is positioned between the first and second positions, when the external force disappears, the protrusion section of the rotatable rod being released from the activation section and the guide slope guiding the locating section to make the rotatable rod restore to the second position.

2. The ratchet pulley as claimed in claim 1, wherein three recesses are sequentially arranged on inner wall of the hub to form the first, second and third positions.

3. The ratchet pulley as claimed in claim 1, wherein the first engagement section is composed of multiple teeth annularly arranged on the inner circumference of the annular pulley and the second engagement section is a protrusion block with a configuration corresponding to a tooth space between two teeth.

4. The ratchet pulley as claimed in claim 1, wherein the first elastic body is a coiled spring.

5. The ratchet pulley as claimed in claim 1, wherein the second elastic body is selected from a group consisting of a coiled spring and a torque spring.

6. The ratchet pulley as claimed in claim 1, wherein the locating section includes a block body, a locating pin and a third elastic body, the block body being fixedly fitted on a middle section of the rotatable rod, the locating pin and the third elastic body being received in the block body, the third elastic body being disposed between the block body and the locating pin for pushing the locating pin to provide a locating effect.

7. The ratchet pulley as claimed in claim 2, wherein the locating section includes a block body, a locating pin and a third elastic body, the block body being fixedly fitted on a middle section of the rotatable rod, the locating pin and the third elastic body being received in the block body, the third elastic body being disposed between the block body and the locating pin for pushing the locating pin to provide a locating effect.

8. The ratchet pulley as claimed in claim 3, wherein the locating section includes a block body, a locating pin and a third elastic body, the block body being fixedly fitted on a middle section of the rotatable rod, the locating pin and the third elastic body being received in the block body, the third elastic body being disposed between the block body and the locating pin for pushing the locating pin to provide a locating effect.

9. The ratchet pulley as claimed in claim 4, wherein the locating section includes a block body, a locating pin and a third elastic body, the block body being fixedly fitted on a middle section of the rotatable rod, the locating pin and the third elastic body being received in the block body, the third elastic body being disposed between the block body and the locating pin for pushing the locating pin to provide a locating effect.

10. The ratchet pulley as claimed in claim 5, wherein the locating section includes a block body, a locating pin and a third elastic body, the block body being fixedly fitted on a middle section of the rotatable rod, the locating pin and the third elastic body being received in the block body, the third elastic body being disposed between the block body and the locating pin for pushing the locating pin to provide a locating effect.

11. The ratchet pulley as claimed in claim 1, wherein the activation section is provided with a security face, a security protrusion corresponding to the security face being disposed on one side of the protrusion section that faces the security face, whereby when the rotatable rod is positioned in the second position and an external force is applied to the annular pulley and the hub to move the annular pulley and the hub to the lower position, the security protrusion abuts against the security face to prevent the rotatable rod from moving to the first position.

12. The ratchet pulley as claimed in claim 2, wherein the activation section is provided with a security face, a security protrusion corresponding to the security face being disposed on one side of the protrusion section that faces the security face, whereby when the rotatable rod is positioned in the second position and an external force is applied to the annular pulley and the hub to move the annular pulley and the hub to the lower position, the security protrusion abuts against the security face to prevent the rotatable rod from moving to the first position.

13. The ratchet pulley as claimed in claim 3, wherein the activation section is provided with a security face, a security protrusion corresponding to the security face being disposed on one side of the protrusion section that faces the security face, whereby when the rotatable rod is positioned in the second position and an external force is applied to the annular pulley and the hub to move the annular pulley and the hub to the lower position, the security protrusion abuts against the security face to prevent the rotatable rod from moving to the first position.

14. The ratchet pulley as claimed in claim 4, wherein the activation section is provided with a security face, a security protrusion corresponding to the security face being disposed on one side of the protrusion section that faces the security face, whereby when the rotatable rod is positioned in the second position and an external force is applied to the annular pulley and the hub to move the annular pulley and the hub to the lower position, the security protrusion abuts against the security face to prevent the rotatable rod from moving to the first position.

15. The ratchet pulley as claimed in claim 5, wherein the activation section is provided with a security face, a security protrusion corresponding to the security face being disposed on one side of the protrusion section that faces the security face, whereby when the rotatable rod is positioned in the second position and an external force is applied to the annular pulley and the hub to move the annular pulley and the hub to the lower position, the security protrusion abuts against the security face to prevent the rotatable rod from moving to the first position.

16. The ratchet pulley as claimed in claim 1, wherein one end of the rotatable rod that is exposed to outer side of the side plate is provided with an indicator for indicating the rotational limit of the annular pulley.

\* \* \* \* \*